Sept. 11, 1962  R. V. EDDS  3,053,720
PROCESS FOR ETCHING METAL HONEYCOMB
Filed March 14, 1960

INVENTOR.
RICHARD V. EDDS.
BY
ATTORNEYS

3,053,720
PROCESS FOR ETCHING METAL HONEYCOMB
Richard V. Edds, Anaheim, Calif., assignor, by mesne assignments, to Purex Corporation, Ltd., a corporation of California
Filed Mar. 14, 1960, Ser. No. 14,964
8 Claims. (Cl. 156—18)

This invention relates to the chemical etching, known as chem milling, of metallic honeycomb by a simplified and efficient procedure, particularly avoiding damage by the etching solution of those portions of the honeycomb which are not intended to be etched.

Cellular structures known as metallic honeycomb are extensively employed in the aircraft industry for production of aircraft wing sections and other parts of the aircraft. This generally requires the shaping or contouring of the honeycomb into the desired configuration for its required service. Due to the extreme difficulty of shaping these light weight cellular structures by mechanical means without deforming or mutilating the honeycomb structure, chemical etching has been resorted to for shaping such structures accurately and without material deformation of the cellular structure.

A most important aspect of the process of chemical etching of metallic honeycomb resides in the proper masking of those portions of the honeycomb core which are not to be etched, from attack by the chemical etchant, so as to confine the chemical etchant to those portions or areas of the core to be removed. According to presently employed procedure, the etchant is confined to those areas to be etched by the use of a maskant which is backed up or stabilized with a resinous material which is introduced into the cells of those portions of the core which are to be protected from chemical attack. Such back-up material is required in order to ensure that any voids in the maskant, which often are formed over the large and irregular surfaces to which the maskant must adhere, and any small openings which may be formed between the maskant and the adjacent cell walls of the honeycomb, do not allow passage of the etchants into good core areas, that is, areas of the honeycomb which are not desired to be etched. Following etching, the back-up or resinous fill material must be removed from the remaining honeycomb core, together with the adjacent maskant.

Particularly where the depth of honeycomb core which is not to be etched is great, so that a substantial depth of back-up or resinous fill material is introduced into the cells of the honeycomb, it becomes difficult and time consuming to remove such fill material following etching. Actually, in many instances it is almost impossible employing presently available resinous fill materials to remove such material following etching from the cells of the honeycomb without mutilation or distortion of the honeycomb.

It is an object of this invention to eliminate the use of such back-up resinous fill material for protecting the cellular honeycomb structure which is not to be removed or etched during treatment of the exposed portions of the honeycomb for removal thereof, e.g. with a chemical etching solution, thus substantially reducing the overall cost of processing the honeycomb.

Yet another object is the substitution for such back-up resinous material of an improved means for protecting the cells of the honeycomb not to be removed or etched, against egress of etchant or etching solution through voids in the maskant and/or between the maskant and adjacent cell walls of the honeycomb, said improved means being efficient, simple, easily applied and requiring substantially less labor and time for removal from the remaining honeycomb following processing, than for removal of the presently employed resinous back-up material.

These and other objects and advantages will become apparent hereinafter.

The invention is based on the discovery of the use of air or other gases inert to the metal of the honeycomb core, to the maskant and the etchants, as a back-up material for the maskant, preventing passage of etchants through such maskant and into contact with areas of the honeycomb not to be etched. By introducing the gas in and around the areas of the honeycomb core not to be removed or etched and located on one side of the maskant, under a small but substantially constant pressure greater than the pressure on the other side of the maskant, e.g. produced by the liquid pressure of the etchant, small amounts of gas will pass out through any voids which may be present in the maskant, preventing egress of liquid etchant through the maskant in the opposite direction and avoiding contact of the etchant with the core section not to be etched. The gas should be maintained under a pressure which is sufficiently great to provide a slight positive pressure against the maskant, but not so great as to produce bulging or to change the shape of the maskant sheet.

The gas pressure can be confined to the desired areas of the honeycomb core in any suitable manner. According to one embodiment, a rigid cover resistant to attack by etchant such as a chemical etching solution, can be placed over the core section which is to be protected against the etchant, and the periphery of the cover clamped or sealed to the maskant. The cover is provided with a gas inlet.

In another embodiment a flat plate is applied adjacent to the face of the honeycomb which is to be protected from etchant attack, said plate having an inlet for air. A fence or frame is placed about the core section to be protected and is spaced a short distance from the sides of the core. The plate is covered with a sealant, and the spaces between the fence and the sides of the honeycomb core are filled with sealant, which thus encloses the core and plate which are to be protected from attack by the etchant, and the enclosing sealant adheres to the maskant. The plate can be in direct contact with the face of the core, or, if desired, the plate can be spaced from the face of the core by suitable means such as a fiber glass cloth separator sheet, to insure uniform passage of air to all of the cells in the enclosed section of the honeycomb core.

In each of the above embodiments, the honeycomb core section on the opposite side of the maskant from the above described enclosed section of the core is exposed, and is then subjected to the action of an etchant, e.g. a chemical etching solution, in any desired manner for removal of the exposed portion of the core. During etching, air or other inert gas is introduced under a controlled preferably constant pressure into the confined zone within the closure occupied by the core section to be protected in each of the embodiments noted above, preventing passage of etchant into such zone in the manner previously noted.

Following etching, or removal of the unwanted core section, the remaining desired honeycomb core is removed from the above noted assemblies by simple separation of the closure from the maskant and from the core, and by stripping or cutting away the maskant from one face of such core.

The invention procedure accordingly eliminates the necessity of the use of resinous back-up material, and the difficult and time consuming operation of removing the resinous back-up material presently employed, from the core following etching.

The process of the invention will be more clearly understood by reference to the description below taken in connection with the accompanying drawing wherein.

Figure 1:
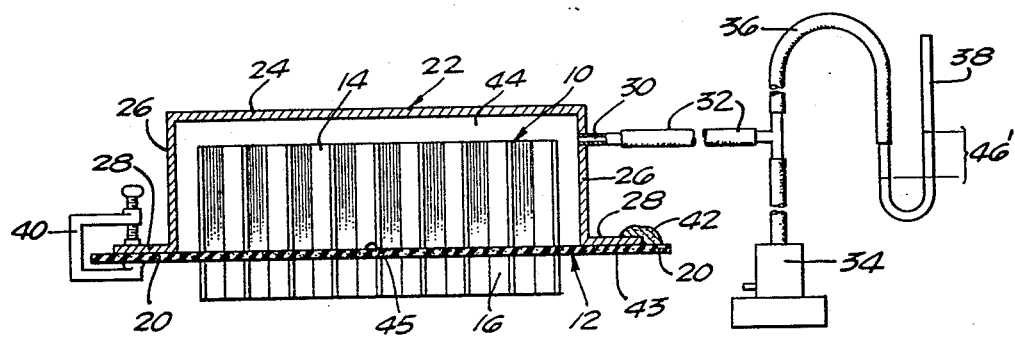
FIG. 1 is an essentially diagrammatic cross sectional view of one embodiment of the unit including the honeycomb, maskant, and closure for the section of honeycomb to be protected, which can be provided and subjected to processing or etching for removal of the undesired honeycomb section, showing also the means for supplying a gas to the closure and regulating the pressure of such gas.

Referring to FIG. 1 of the drawing, according to one mode of procedure, the honeycomb core, designated by numeral 10, has positioned thereon a sheet of maskant 12, so as to separate the honeycomb core into two sections, one on each side of the maskant 12. The section of core 10 which is to be protected from attack by the chemical etching solution is indicated by numeral 14 and the section of core 10 on the other side of maskant 12, and which is to be etched away by the chemical etchant, is designated by numeral 16.

Figures 2, 3:
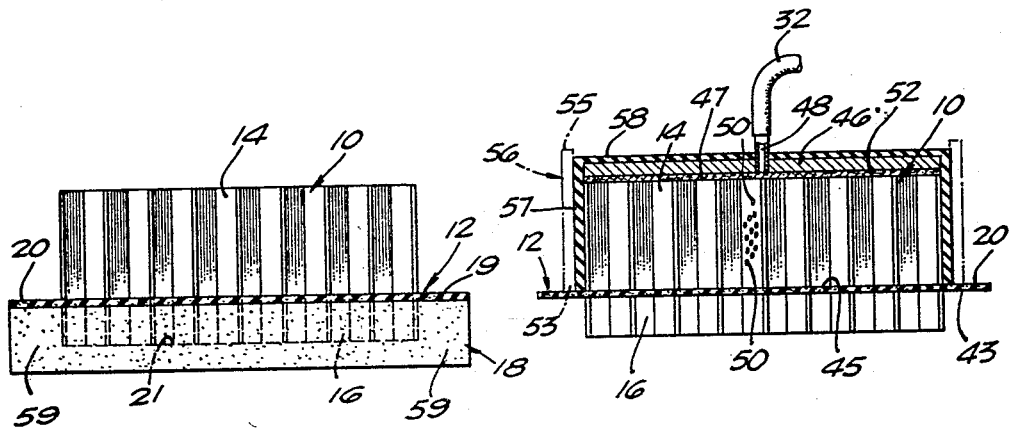
FIG. 2 illustrates a step in the procedure for initially applying the maskant to the honeycomb core.
FIG. 3 is an essentially diagrammatic cross sectional view similar to FIG. 1, of a preferred modified unit including honeycomb, maskant and closure for the section of honeycomb to be protected, which unit is subjected to etching by the invention process.

The maskant sheet 12 is placed in the proper position on the honeycomb core 10 in the manner illustrated in FIG. 2. A mold 18 is first formed having a surface configuration 19 corresponding to a desired pattern, and which configuration is to be imparted to the honeycomb core by the etching solution. Such mold can be formed of any material which can be removed readily, e.g. by washing with water. A suitable mold material of this type is plaster, which when dried can be disintegrated with water. Following drying of the mold, e.g. plaster, a liquid maskant coating material is applied, e.g. by brushing, to the surface 19 of the mold, to form the maskant sheet 12. This coating material can be any material which is resistant to attack by etchants, e.g. chemical etchants either of an acidic or alkaline type, and which has the ability to form an adhesive bond with the cell walls of the core. Liquid coating materials having these properties include, for example, rubber latex compositions, such as those containing neoprene or copolymers of neoprene with other materials such acrylonitrile. The coating applied to the plaster mold may be about $\frac{1}{32}$ to $\frac{1}{16}$ inch thick. The maskant coating 12 is partially cured, e.g. by heating. In some instances, instead of coating a material on the mold to form a maskant on curing of such material, an at least partially precured sheet of maskant can be applied to the surface of the mold.

The mold 18 and the coating or sheet 12 thereon are placed in a press, and the honeycomb core 10 is placed over the mold and maskant sheet 12. The core 10 is then forced through the maskant 12 into the mold 18 to the proper depth, as illustrated at dotted line 21 in FIG. 2. The entire assembly shown in FIG. 2 is then heated in an oven to completely cure the maskant coating 12 during which the latter seals any cuts in such coating made by the honeycomb core, and lightly bonds to the adjacent areas or cell walls of the honeycomb core. The plaster mold 18 can then be washed away by water, leaving the unit composed of the honeycomb core 10 and the maskant sheet 12 properly positioned on the honeycomb as seen in FIG. 1. The maskant sheet 12, it will be noted, extends beyond the core block to provide a peripheral portion 20. Such peripheral portion 20 may extend for say 2 to 3 inches from the sides of the core.

Referring back to FIG. 1, a rigid chemically resistant cover 22 is placed over the honeycomb section 14 to be protected against the etching solution. The top 24 and sides 26 of the cover are preferably spaced from the adjacent areas of the honeycomb section 14, and the cover has a peripheral flange 28. At one side of the cover is connected a gas inlet 30 to which is attached a hose 32 connected to a gas supply under pressure to a compressor 34. Hose 32 carries a branch 36 connected to a liquid filled manometer 38.

The cover 22 may be composed of a chemically resistant plastic, or it may be formed of metal coated with a sealant which is resistant to attack by chemical etchants. The peripheral flange 28 of the cover can be secured to the periphery 20 of the maskant 12 by mechanical clamps indicated at 40, or by adhesively securing flange 28 to the periphery 20 of the maskant by means of an adhesive such as a vinyl, neoprene or epoxy type adhesive. Such adhesive seal is indicated at 42 FIG. 1. If desired, a chemically resistant adhesive tape can be employed in place of the sealant 42. The peripheral portion 20 of maskant 12 can be supported at its undersurface 43 by any suitable means (not shown) during the attaching of the cover flange 28 to such peripheral mask portion. The securing of the flange 28 of the cover to the periphery of the maskant 12 assures a tight connection between the cover and maskant to prevent egress of etchants, e.g. chemical etching solution, therebetween and into contact with the core section 14 which is not to be etched. Thus, the assembly including the cover 22 and maskant 12 forms a tight closure about the core section 14 which is to be protected from the etchant.

Just prior to treatment of the core section 16 to be etched, with etchant, the gas from the supply or compressor 34 is turned on to introduce gas into the space 44 between the cover 22 and maskant 12 which is occupied by the honeycomb section 14. Air or any inert gas can be employed. Preferably a constant differential pressure of relatively low magnitude is applied to that side of the maskant adjacent the enclosed core section 14. This differential pressure may be of the order of about 1 mm. Hg. The pressure maintained should not be so great as to cause outward bulging of the maskant 12 to displace the maskant in the direction of the honeycomb section 16 to be etched, since inaccurate results would thereby be obtained or the maskant could be ruptured by such excess pressure. The pressure in space 44 is conveniently controlled by visual observation of the differential level of the liquid, e.g. water, used in the manometer, and indicated at 46'.

While the gas pressure is maintained within the space 44 defined by cover 22, the unwanted section 16 of the honeycomb core is subjected to treatment with suitable etchants for removal. Such etchants can be applied by spray, flow or splash applications. If desired, such etching can also be accomplished by immersion of core section 16 in an etching bath. In the latter case, the assembly may be weighted or secured in a suitable manner to overcome any buoyancy of the unit in order to assure its position in the etchant so that the core section 16 to be etched is below the surface of the etching solution.

As will be recognized, any suitable etchant can be employed. Usually, chemical etching solutions are employed, either alkaline or acidic, depending upon the composition of the honeycomb metal. Where, for example, the honeycomb is composed of aluminum or its alloys, and is alkali soluble, a hot aqueous solution is generally employed containing an alkali such as sodium or potassium hydroxide, trisodium phosphate, soda ash or the like, or mixtures thereof. Preferably a sodium hydroxide solution is used. Temperature is generally maintained in a range say from 100° F. to about boiling during treatment, although lower temperatures may be used. Generally, the alkali concentration employed in such solutions range from 0.1 to 10 normal. If desired, additives such as the sulphur-containing additives, e.g. sodium sulfide, of U.S. Patents 2,795,490 and 2,795,491, can be incorporated in the alkaline solution to improve the effectiveness thereof. Where the honeycomb is composed of acid soluble metals such as iron, titanium or magnesium, for example, acid etchants such as aqueous nitric, hydrochloric or hydrofluoric acid, or mixtures thereof are employed. Further, it is noted that aluminum may also be etched by means of an acid etching solution such as hydrochloric acid, or by means of solutions of salts such as ferric sulfate.

While the use of chemical etchants is preferred other suitable types of etching techniques may be employed for removal of the undesired core section, e.g. vapor honing.

During treatment of the core section 16 with the etchant or etching solution, a positive gas pressure, preferably maintained substantially constant, is introduced in the space 44 under the cover 22, in the manner described above. This application of a small differential pressure against the side 45 of the maskant ensures that etchant will not pass through any voids in the maskant or through crevices formed by separation of portions of the maskant from the adjacent cell walls of the honeycomb. Thus, there is produced a slight flow of gas outwardly from space 44 through any such minute voids in the maskant 12 or through any such crevices or leaks formed between the maskant and the adjacent cell walls, preventing flow of etchant or etching solution through such voids or crevices in the reverse direction, and hence avoiding introduction of etchant into the space 44 and into contact with the honeycomb section 14. Also, the chemically resistant closure or cover 22 prevents contact of any etchant with the honeycomb section 14.

Following disintegration of the honeycomb section 16 by the etchant or etching solution, the honeycomb-containing unit is removed from contact with the etchant, is rinsed free of any adhering etchant, and the hose 32 is disconnected from inlet 30 of the cover. The clamps 40 are then removed, or where an adhesive seal such as 42 is employed between the cover flange 28 and the periphery 20 of the maskant, such sealant is cut or stripped away, permitting withdrawal of the cover 22 from the remaining unetched honeycomb section 14. The maskant 12 connected to one face of the remaining core section 14 is then chemically or mechanically removed as by cutting, from contact with the ends of the cells of such core section, leaving a final honeycomb core having the desired configuration.

Figure 4:
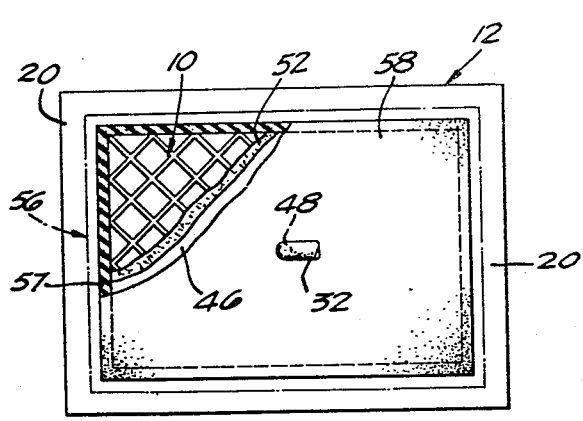
FIG. 4 shows a plan view of the unit of FIG. 3.

Referring now to FIGS. 3 and 4 directed to a modification of the invention, in place of the cover 22 of FIG. 1, a rigid plate 46 having the same length and width as the honeycomb core is placed over the face 47 of the core section 14 to be protected from the etching solution, and over the open ends of the cells thereof. A gas inlet 48 is provided in about the center of plate 46 and extending upwardly therefrom. The plate 46 may rest in direct contact with the face 47 of the core, if the walls of the individual core cells contain perforations such as indicated at 50 to permit passage of gas from one cell to the other, so that gas introduced into the core section 14 via inlet 48 is uniformly distributed throughout all the cells of the honeycomb section 14 and a uniform pressure is thus exerted against the maskant 12. However, where the honeycomb cells do not contain perforations such as 50, in order to assure uniform distribution of gas and a uniform pressure in all of the cells, a porous separator indicated at 52, and formed, for example, of fiber glass cloth, can be sandwiched between the face 47 of the core section 14 and the plate 46, which thus rests on such porous separator. By this expedient, gas introduced through 48 is uniformly distributed via the porous separator 52 throughout the core section 14, and a uniform pressure is applied against the adjacent surface 45 of maskant 12.

A frame or fence indicated by the broken line 56 is placed around the honeycomb core section 14, such frame being spaced from the adjacent sides of the core section. The frame can be constructed readily from four separate plates joined together at their ends to form the four corners of such frame. As indicated in FIG. 3, one end 53 of frame 56 is placed in contact with the maskant 12, the other end of the frame 55 extending somewhat above plate 46.

A chemically resistant sealant composition which is pourable can be introduced into the spaces between the walls of frame 56 and the adjacent sides of the honeycomb section 14 to form a chemically resistant wall 57 about the core section 14. The sealant is also applied over the plate 46 to form a coating 58 thereon and which seals the periphery of the cover to the wall 57. This sealant may be of the type noted above for producing the seal 42 in FIG. 1. During application of the sealant to form the wall 57, the lower surface 43 of the maskant periphery 20 is supported by any suitable means (not shown). After curing of the sealant, the frame 56 is removed, leaving a chemically resistant closure formed of wall 57 and top coating 58, about the core section 14, the wall 57 being sealed along its lower edge to the periphery 20 of the maskant 12.

The hose 32 of the gas supply is connected to gas inlet 48 and the gas is turned on at the gas supply or compressor 34, the pressure being regulated in the manner noted above by the manometer 38 to apply a light differential pressure in the space occupied by core section 14 against the surface 45 of the maskant 12, such differential pressure insuring against introduction of etchant into core section 14 via any voids or leaks in maskant 12, as described above. The unit is now subjected to the action of an etchant or etching solution in the manner previously described until the core section 16 is removed or etched away, the core section 14 being protected from contact with etchant by the passage of gas from core section 14 outwardly through any voids or leaks in the maskant 12, and by the impervious closure formed by wall 57 and top coating 58.

After etching and rinsing are completed, the hose 32 is disconnected from inlet 48. The lower end of wall 57 at its juncture with the maskant 12 is then cut away, as is also the upper end of wall 57 at its juncture with seal coat 58. The seal between the periphery of plate 46 and the adjacent areas of the upper face 47 of the honeycomb is cut away to remove plate 46 from the core, together with the porous separator 52, where employed. Finally, the maskant 12 is mechanically or chemically removed from the opposite lower face of the core section 14, leaving the final desired core 14. All of these stripping or removing operations are easily and rapidly carried out with a minimum expenditure of time and effort.

If desired, the mold 18 can be retained during application of the closure in the embodiments of FIGS. 1 and 3, over the honeycomb core section 14 to be protected against the action of the etchant. This technique has the advantage that the end portions 59 of the mold can then function as a support for the peripheral portion 20 of the maskant during application of the closure and its attachment to the periphery 20 of the maskant. This is particularly convenient with respect to forming the closure in the embodiment of FIGS. 3 and 4. The mold 18 is then removed by treatment with a disintegrating medium such as water just prior to subjecting section 16 of the honeycomb core to the action of an etchant.

Figure 5:
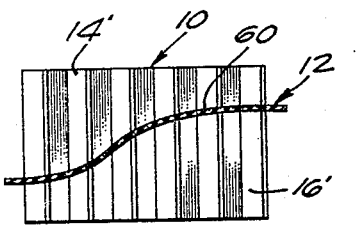
FIG. 5 illustrates positioning of the maskant on the honeycomb to obtain a desired contoured etch of the honeycomb core.

The mode of forming the closure for the core section 14 according to FIGS. 3 and 4 of the drawing is preferred over that illustrated in FIG. 1, in being more versatile and being adapted more readily to use with honeycomb sections of varying size and varying contour with respect to the final etch desired as dictated by the position of the maskant on the honeycomb. Thus, for example, as shown in FIG. 5, where the final etched honeycomb section 14' of the core 10 is to have a curved configuration as indicated at 60, this necessitates the positioning of the maskant 12 in a manner to impart thereto a corresponding curvature as seen in FIG. 5, in order to permit proper etching of the core section 16' to obtain the final desired honeycomb core section 14'. The provision of a closure for the core section 14' in contact with the curved peripheral surface of the maskant 12 is facilitated by employing the technique described in connection with FIGS. 3 and 4, as compared to the technique described in connection with FIG. 1.

It is accordingly seen that I have provided a novel, versatile, and simple procedure for backing up the maskant during removal or etching of honeycomb core to a desired configuration, to avoid contact of etching solution with that section of the honeycomb core which is to be protected from the etchant.

The invention procedure also has the following advantages: (1) It eliminates the problems of being sure that all of the honeycomb cells of the section of the core to be protected are filled with liquid or solid back-up material as employed in conventional procedures; (2) it eliminates the difficult problem of filling the small honeycomb cells of such core; (3) it eliminates the time consuming work of removing "back-up" materials from the cells following etching; (4) greater safety is obtained due to the fact that observation of the manometer or other pressure measuring device will indicate if areas behind the mask are or are not being protected from the etchant.

While I have described particular embodiments of my invention for the purpose of illustration, it should be understood that various modifications and adaptations thereof may be made within the spirit of the invention as set forth in the appended claims.

I claim:

1. A process for etching cellular honeycomb core, which comprises placing a closure about a first section of a honeycomb core to be protected against attack by an etchant, said closure being resistant to attack by said etchant, securing said closure to the periphery of a maskant fixedly positioned on said honeycomb core transversely of the longitudinally extending cells of said honeycomb core, treating a second exposed section of said honeycomb core extending outwardly of said maskant beyond said closure, with said etchant, and introducing an inert gas into said closure occupied by said first section of honeycomb core during said etching treatment, and maintaining a gas pressure in said closure and against the adjacent side of said maskant greater than the pressure on the opposite side of said maskant, and disintegrating said second core section during said etching treatment, said closure and said maskant remaining stationary with respect to said first section of honeycomb core during said etching treatment.

2. A process for chemically etching cellular honeycomb core to produce a core having a predetermined contour, which comprises forming a mold having a desired contour, applying a maskant material to the surface of said mold, forming a maskant sheet resistant to the action of a chemical etchant on the surface of said mold, inserting a honeycomb core through said maskant sheet and into said mold, a first section of said core extending outwardly from said mold and said sheet, and a second section of said core being embedded in said mold, removing said mold and leaving said maskant sheet in position, said sheet having a peripheral portion extending outwardly beyond said core, enclosing said first section of said core on one side of said maskant sheet with a closure resistant to attack by said chemical etchant, securing said closure to said outwardly extending peripheral portion of said maskant sheet, treating a second exposed section of said honeycomb core extending from the opposite side of said maskant sheet, with a chemical etchant, introducing an inert gas into said closure occupied by said first section of honeycomb core during said etching treatment, and maintaining a gas pressure in said closure and against the adjacent side of said maskant greater than the pressure on the opposite side of said maskant, and disintegrating said second core section during said etching treatment.

3. A process for chemically etching cellular honeycomb core, which comprises placing a cover having a peripheral flange about a first section of a honeycomb core to be protected against attack by a chemical etchant, said cover being resistant to attack by said chemical etchant, securing the peripheral flange of said cover to the periphery of a maskant in the form of a sheet fixedly positioned on said honeycomb core transversely of the longitudinally extending cells of said honeycomb core, said maskant being resistant to the action of said chemical etchant, treating a second exposed section of said honeycomb core extending outwardly of said maskant beyond said closure with a chemical etchant, introducing an inert gas within said cover occupied by said first section of honeycomb core during said etching treatment, and maintaining a gas pressure in said cover and against the adjacent side of said maskant greater than the pressure on the opposite side of said maskant, and disintegrating said second core section during said etching treatment, said cover and said maskant remaining stationary with respect to said first section of honeycomb core during said etching treatment.

4. A process as defined in claim 3, wherein said peripheral flange of said cover is secured to the periphery of said maskant by mechanically clamping together said flange and maskant periphery.

5. A process as defined in claim 3, wherein said peripheral flange of said cover is secured to the periphery of said maskant by adhesively securing together said flange and maskant periphery.

6. A process for chemically etching cellular honeycomb core, which comprises placing a plate adjacent the face of a first section of said core, said plate substantially covering said face, placing a closed frame around said first section of said core, said frame being spaced from the adjacent sides of said core and extending from said plate to the periphery of a maskant in the form of a sheet fixedly positioned on said honeycomb core transversely of the longitudinally extending cells of said honeycomb core, said maskant being resistant to the action of a chemical etchant, inserting a sealing material in the spaces between said frame and the adjacent sides of said honeycomb core to form a wall about said first core section, and applying a sealing material over said plate, and sealing said plate to said wall, thereby forming a closure for said first core section, said closure being secured by the sealing material of said wall to the periphery of said maskant, said closure being resistant to attack by said chemical etchant, removing said frame, treating a second exposed section of said honeycomb core extending outwardly of said maskant beyond said closure with a chemical etchant, introducing an inert gas into said closure occupied by said first section of honeycomb core during said etching treatment, and maintaining a gas pressure in said closure and against the adjacent side of said maskant greater than the pressure on the opposite side of said maskant, and disintegrating said second core section during said etching treatment.

7. A process for chemically etching cellular honeycomb core to produce a core having a predetermined contour which comprises forming a mold having a desired contour, applying a maskant material to the surface of said mold, forming a maskant sheet resistant to the action of a chemical etchant on the surface of said mold, inserting a honeycomb core through said maskant sheet and into said mold, a first section of said core extending outwardly from said mold and said sheet, and a second section of said core being embedded in said mold, placing a plate adjacent the face of said first section of said core, said plate substantially covering said face, placing a closed frame around said first section of said core and substantially normal to said plate, said frame being spaced from the adjacent sides of said core and extending from said plate to the periphery of said maskant sheet, said maskant being resistant to the action of a chemical etchant, inserting a sealing material in the spaces between said frame and the adjacent sides of said honeycomb core to form a wall adjacent said first core section, and applying a sealing material over said plate, and sealing said plate to said wall, thereby forming a closure for said first core section, said closure being secured by the sealing material of said wall to the periphery of said maskant sheet, said closure being resistant to attack by said chemical etchant, removing said frame, removing said mold, treating the exposed second section of said honeycomb core extending outwardly of said maskant beyond said closure with a chemical etchant, introducing an inert gas into said closure occupied by said first section of honeycomb core during said etching treatment, and maintaining a gas pressure in said closure and against the adjacent side of said maskant greater than the pressure on the opposite side of said maskant, and disintegrating said second core section during said etching treatment.

8. A process as defined in claim 3, wherein said maskant is composed of a neoprene type material.

References Cited in the file of this patent

UNITED STATES PATENTS

| | | |
|---|---|---|
| 2,523,019 | Henderson | Sept. 19, 1950 |
| 2,820,312 | Coontz | Jan. 21, 1958 |
| 2,849,299 | Young | Aug. 26, 1958 |
| 2,958,147 | Monahan | Nov. 1, 1960 |